United States Patent

Choi

(10) Patent No.: US 9,435,250 B2
(45) Date of Patent: Sep. 6, 2016

(54) ENGINE SYSTEM HAVING TURBOCHARGER

(71) Applicant: Hyundai Motor Company, Seoul (KR)

(72) Inventor: Won Rok Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 120 days.

(21) Appl. No.: 14/444,656

(22) Filed: Jul. 28, 2014

(65) Prior Publication Data

US 2015/0159542 A1  Jun. 11, 2015

(30) Foreign Application Priority Data

Dec. 11, 2013  (KR) .................. 10-2013-0154198

(51) Int. Cl.

| | |
|---|---|
| *F02B 33/44* | (2006.01) |
| *F02B 29/04* | (2006.01) |
| *F02M 25/07* | (2006.01) |
| *F02B 37/00* | (2006.01) |

(52) U.S. Cl.
CPC ....... *F02B 29/0462* (2013.01); *F02B 29/0437* (2013.01); *F02B 29/0475* (2013.01); *F02B 37/00* (2013.01); *Y02T 10/121* (2013.01); *Y02T 10/144* (2013.01); *Y02T 10/146* (2013.01)

(58) Field of Classification Search
CPC  F02B 29/0462; F02B 29/0437; F02B 37/00; F02M 25/0707; F02M 25/0726
USPC ............................ 60/605.2, 599; 123/568.12
See application file for complete search history.

(56) References Cited

U.S. PATENT DOCUMENTS

| | | | | |
|---|---|---|---|---|
| 6,116,026 | A * | 9/2000 | Freese | ................ 60/605.2 |
| 7,089,890 | B2 * | 8/2006 | Obidi | ................ 123/568.12 |
| 7,237,513 | B2 * | 7/2007 | Pfeffinger et al. | ......... 123/41.29 |
| 7,721,543 | B2 * | 5/2010 | Massey et al. | .............. 60/605.2 |
| 7,921,829 | B2 * | 4/2011 | Hayashi | ................ 123/568.12 |
| 8,813,730 | B2 * | 8/2014 | Korenaga et al. | ....... 123/568.12 |
| 2008/0264609 | A1 * | 10/2008 | Lutz et al. | .............. 165/104.19 |
| 2009/0314266 | A1 * | 12/2009 | Hori et al. | ............... 123/568.12 |
| 2010/0224142 | A1 * | 9/2010 | Iwamoto et al. | ............... 60/301 |
| 2011/0023796 | A1 * | 2/2011 | Cattani et al. | ........... 123/568.12 |
| 2011/0041814 | A1 * | 2/2011 | Kardos et al. | ........... 123/568.12 |

(Continued)

FOREIGN PATENT DOCUMENTS

| | | | | |
|---|---|---|---|---|
| DE | 102004032777 A1 * | 7/2005 | .......... | F02B 29/0418 |
| DE | 102010006309 A1 * | 7/2011 | .............. | F02B 37/00 |

(Continued)

*Primary Examiner* — Thai Ba Trieu
(74) *Attorney, Agent, or Firm* — Morgan, Lewis & Bockius LLP

(57) ABSTRACT

An engine system having a turbocharger may include a cylinder head, at which an intake manifold and an exhaust manifold may be positioned, the turbocharger which may be connected to the exhaust manifold, an intake line formed between the turbocharger and the intake manifold to transmit compressed air compressed by the turbocharger, through the cylinder head, an intercooler disposed to be adjacent to the intake manifold to cool the compressed air supplied through the intake line, an Exhaust Gas Recirculation (EGR) line connecting the exhaust manifold and the intake manifold to recirculate the exhaust gas, to the intake manifold through the cylinder head, and an EGR cooler disposed to be adjacent to the intake manifold, wherein a low-temperature coolant supplied from a low temperature radiator to pass through the cylinder head to cool the compressed air and the EGR gas that pass through the cylinder head.

11 Claims, 9 Drawing Sheets

(56) References Cited

U.S. PATENT DOCUMENTS

| | | | |
|---|---|---|---|
| 2011/0125361 A1* | 5/2011 | Weber et al. | 123/41.01 |
| 2011/0253076 A1* | 10/2011 | Mikame | F01P 3/202 |
| | | | 123/41.31 |
| 2013/0213367 A1* | 8/2013 | Grosch et al. | 123/563 |
| 2013/0263797 A1* | 10/2013 | Sugiura | F02B 29/0462 |
| | | | 123/41.01 |
| 2014/0245735 A1* | 9/2014 | Kuske et al. | 60/599 |
| 2014/0374498 A1* | 12/2014 | Quix et al. | 237/12.3 R |
| 2015/0107566 A1* | 4/2015 | Sugiyama et al. | 123/568.12 |
| 2015/0159592 A1* | 6/2015 | Choi | F02M 25/0726 |
| 2015/0159593 A1* | 6/2015 | Choi | F02M 25/0726 |
| 2015/0167595 A1* | 6/2015 | Choi | F02M 25/0706 |

FOREIGN PATENT DOCUMENTS

| | | | | |
|---|---|---|---|---|
| DE | 102011013029 A1 | * | 9/2011 | F02M 25/07 |
| EP | 1908951 A1 | * | 4/2008 | F02M 25/07 |
| GB | 2416001 A | * | 1/2006 | F02B 29/0406 |
| GB | 2 455 532 A | * | 6/2009 | F02M 25/07 |
| JP | 2011132852 A | * | 7/2011 | F02M 25/07 |
| JP | 2011190742 A | * | 9/2011 | F02M 25/07 |
| WO | WO 2004044401 A1 | * | 5/2004 | F02B 29/04 |

* cited by examiner

ENGINE SYSTEM HAVING TURBOCHARGER

CROSS-REFERENCE TO RELATED APPLICATION

The present application claims priority to and the benefit of Korean Patent Application No. 10-2013-0154198 filed on Dec. 11, 2013, the entire contents of which is incorporated herein for all purposes by this reference.

BACKGROUND OF THE INVENTION

1. Field of the Invention

The present invention relates to an engine system having the turbocharger which improves output in a low-speed section using a turbocharger, and improves combustion efficiency and quality of exhaust gas.

2. Description of Related Art

In general, it is known that a diesel engine consumes less fuel and has excellent efficiency in comparison with a gasoline engine. Typically, the diesel engine exhibits efficiency of about 40%, which results from a high compression ratio of the diesel engine.

The recent engine additionally has a turbocharger, an intercooler, and the like in order to obtain higher output.

The engine to which the turbocharger is applied as described above sucks and compresses exhaust gas or external air using a compressor of the turbocharger, and supplies supercharged air (high-temperature compressed air), which is generated by the turbocharger, to an engine side.

However, the air, which is rapidly compressed, absorbs heat from the turbocharger and heat that is generated during a compression process, such that density of the air is decreased, and as a result, charging efficiency in a combustion chamber of the engine deteriorates.

Therefore, high density may be obtained by cooling the supercharged air using the intercooler, and as a result, a larger amount of air may be sucked in the combustion chamber of the engine, thereby obtaining high output.

Meanwhile, the intercooler is mounted in the middle of an intake line, and the intake line, which is formed from the intercooler to an intake manifold, is increased such that responsiveness may deteriorate, and efficiency of the intercooler may deteriorate. Moreover, since the intercooler is mounted together with an Exhaust Gas Recirculation (EGR) cooler, a cooling load is increased such that overall cooling efficiency and performance may deteriorate.

FIG. 9 is a schematic diagram of an engine having an intercooler. Referring to the FIG. 9, an inlet duct 900 is connected to one side of an intercooler 135, and an outlet duct 905 is connected to the other side of the intercooler 135.

Intake air passes the inlet duct 900, the intercooler 135, and the outlet duct 905 to be supplied to a combustion chamber of an engine, the intake air is cooled by outside air that passes the intercooler 135. Meanwhile, the intake air is cooled by the outside air, the cooling performance can be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine system having the turbocharger which stably cools high-temperature compressed air compressed by a turbocharger, reduces capacity of a water-cooled intercooler, improves responsiveness of the turbocharger, and stably cools EGR gas, thereby improving cooling efficiency and performance together.

In an aspect of the present invention, an engine system having a turbocharger, may include a cylinder head, at which an intake manifold and an exhaust manifold are positioned, the turbocharger which is connected to the exhaust manifold and compresses intake air using exhaust gas discharged from the exhaust manifold, an intake line which is formed between the turbocharger and the intake manifold so as to transmit compressed air, which is compressed by the turbocharger, through the cylinder head, an intercooler which is disposed to be adjacent to the intake manifold so as to cool the compressed air that is supplied through the intake line, an Exhaust Gas Recirculation (EGR) line connecting the exhaust manifold and the intake manifold and recirculates the exhaust gas, which is discharged from the exhaust manifold, to the intake manifold through the cylinder head, and an EGR cooler which is disposed to be adjacent to the intake manifold so as to receive an EGR gas from the EGR line and cool the EGR gas, wherein a low-temperature coolant that is supplied from a low temperature radiator to pass through the cylinder head and cools the compressed air and the EGR gas that pass through the cylinder head.

The low-temperature coolant that is supplied from the low temperature radiator circulates through a coolant line independently of an engine coolant for cooling the cylinder head.

The coolant line through which the low temperature coolant that is supplied from the low temperature radiator passes through the cylinder head so as to cool the compressed air, which passes through the cylinder head in the intake line, and the EGR gas, and then sequentially passes through the intercooler and the EGR cooler, and circulates through the low temperature radiator and a coolant pump.

The coolant line through which the low temperature coolant that is supplied from the low temperature radiator passes through the cylinder head so as to cool the compressed air, which passes through the cylinder head in the intake line, and the EGR gas, and then sequentially passes through the EGR cooler and the intercooler, and circulates through the low temperature radiator and a coolant pump.

The coolant line through which the low temperature coolant that is supplied from the low temperature radiator passes through the intercooler and the EGR cooler, and then passes through the cylinder head so as to cool the compressed air and the EGR gas that pass through the cylinder head, and circulates through a coolant pump and a Low-temperature radiator.

The intercooler and the EGR cooler are coupled to the intake manifold.

The intercooler and the EGR cooler are coupled to each other.

The EGR gas, which is cooled by the EGR cooler, is mixed with the intake air, which is cooled by the intercooler, in the intake manifold.

The EGR cooler and the intercooler are sequentially disposed in series in a flow direction in which the intake air passes through the intercooler.

The EGR cooler and the intercooler are disposed side by side and in parallel with a flow direction in which the intake air passes through the intercooler.

A compressed air passage, which passes through the cylinder head, is formed in a cylindrical shape so as to correspond to the intake line, wherein an EGR gas passage, which passes through the cylinder head, is formed in a cylindrical shape so as to corresponding to the EGR line, and wherein a low-temperature coolant passage through which the low-temperature coolant passes that is supplied from the low temperature radiator is formed at a periphery of the compressed air passage and the EGR gas passage.

According to the exemplary embodiment of the present invention, since the intake line penetrates the cylinder head instead of being formed to deviate from the cylinder head, a length of the intake line is shortened, and the compressed air is first cooled by the low-temperature coolant that passes through the cylinder head, thereby reducing a load and capacity of the intercooler.

In addition, since the EGR line penetrates the cylinder head instead of being formed to deviate from the cylinder head, a length of the EGR line is shortened, and the EGR gas is first cooled by the low-temperature coolant that passes through the cylinder head, thereby reducing a load and capacity of the EGR cooler.

Further, the EGR cooler, the intercooler, and the intake manifold are coupled, such that a length of the coolant line, which circulates through the EGR cooler, the intercooler, and the intake manifold, is shortened, overall cooling efficiency is improved, the number of components is reduced, and productivity is improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
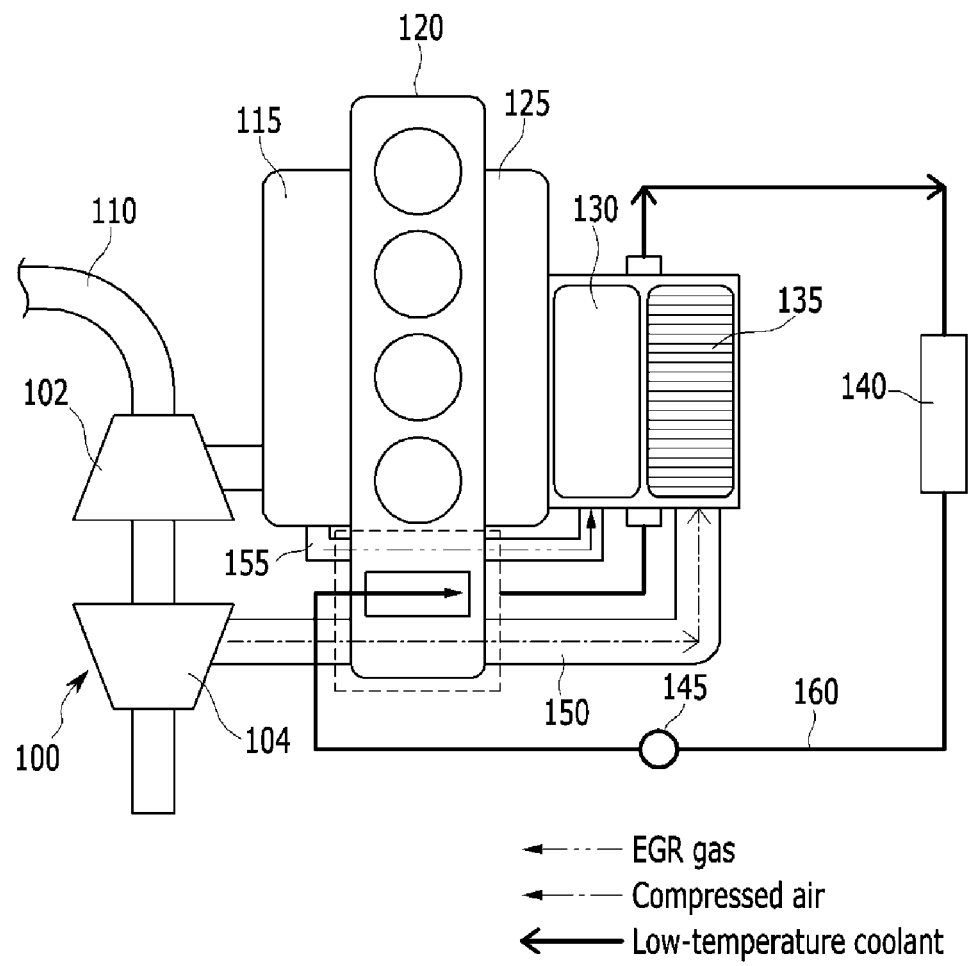
FIG. 1 is a schematic configuration diagram of an engine system having the turbocharger according to a various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic configuration diagram of an engine system having the turbocharger according to a first exemplary embodiment of the present invention.

Referring to FIG. 1, an engine system having the turbocharger includes the turbocharger 100 including a turbine 102 and a compressor 104, an exhaust line 110, an exhaust manifold 115, a cylinder head 120, an intake manifold 125, an EGR cooler 130, an intercooler 135, a Low-temperature radiator 140, a coolant line 160, a coolant pump 145, an intake line 150, and an EGR line 155.

Compressed air, which is compressed by the compressor 104, is supplied to the intercooler 135, the intake manifold 125, a combustion chamber of the cylinder head 120 through the intake line 150, and combusted gas, which is combusted in the combustion chamber, is discharged to the outside through the exhaust manifold 115, the turbine 102, and the exhaust line 110.

The EGR line 155 is formed to recirculate EGR gas from the exhaust manifold 115 to the EGR cooler 130. The intercooler 135 and the EGR cooler 130 are disposed in series in a direction in which intake air flows.

That is, the intake air sequentially passes through the intercooler 135 and the EGR cooler 130, and the intake air and EGR gas are mixed at a rear end portion of the intercooler 135.

The compressed air, which passes through the intake line 150, is supplied to the intercooler 135 through the cylinder head 120, and the EGR gas, which passes through the EGR line, is also supplied to the EGR cooler 130 through the cylinder head 120.

The coolant line 160 cools the compressed air and the EGR gas, which pass through the cylinder head 120, while passing one side of the cylinder head 120, and circulates through the Low-temperature radiator 140 and the coolant pump 145 after passing the intercooler 135 and the EGR cooler 130.

Figure 2:
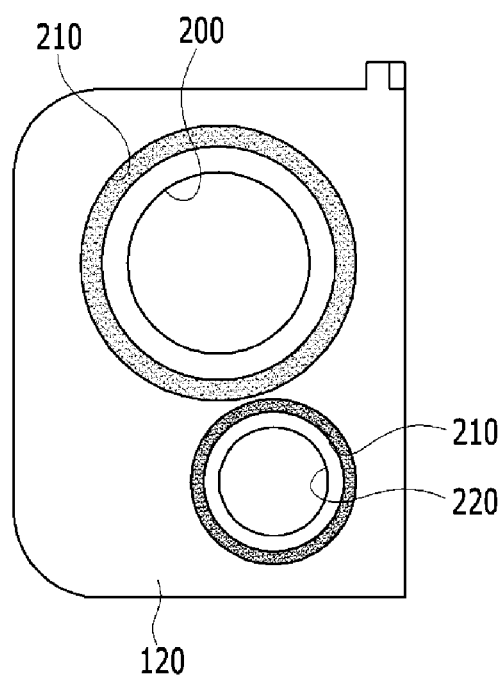
FIG. 2 is a partial cross-sectional view of the engine system having the turbocharger according to the various exemplary embodiments of the present invention.

FIG. 2 is a partial cross-sectional view of the engine system having the turbocharger according to the first exemplary embodiment of the present invention.

Referring to FIG. 2, a compressed air passage 200 through which the compressed air compressed by the compressor 104 of the turbocharger 100 passes is formed in the cylinder head 120, and an EGR gas passage 220 through which the EGR gas in the EGR line 155, which is formed from the exhaust manifold 115 to the EGR cooler 130, passes is formed in the cylinder head 120.

The compressed air passage 200 and the EGR gas passage 220 are formed to be adjacent to each other, and low-temperature coolant passages 210 through which a low-temperature coolant passes are formed along circumferences of the compressed air passage 200 and the EGR gas passage 220.

In the exemplary embodiment of the present invention, the low-temperature coolant flows along a separate coolant line independently of an engine coolant that cools the cylinder head 120, and the engine coolant flows along an engine coolant line.

Further, in the exemplary embodiment of the present invention, the compressed air and the EGR gas are cooled by the low-temperature coolant while passing through the cylinder head 120, and cooled again by the intercooler 135 and the EGR cooler 130, thereby improving cooling efficiency, and reducing cooling loads of the intercooler 135 and the EGR cooler 130.

Figure 3:
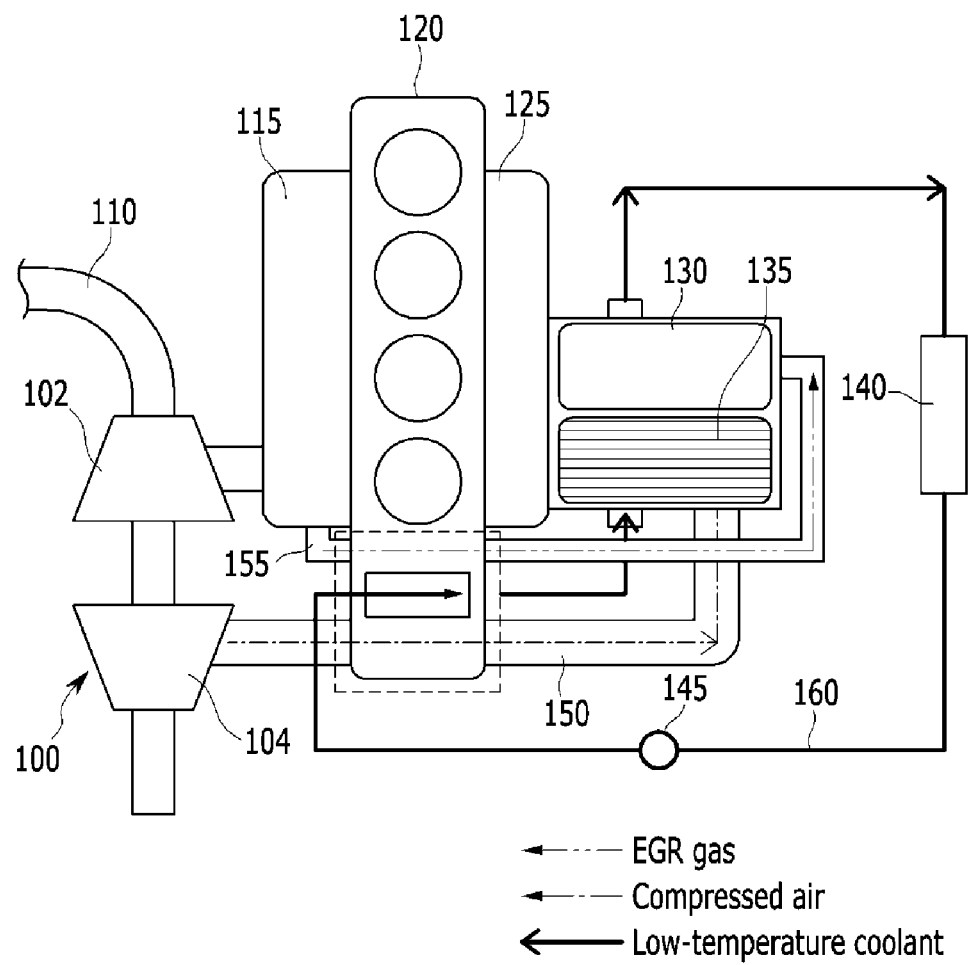
FIG. 3 is a schematic configuration diagram of an engine system having the turbocharger according to a various exemplary embodiments of the present invention.

FIG. 3 is a schematic configuration diagram of an engine system having the turbocharger according to a second exemplary embodiment of the present invention. Elements different from the elements illustrated in FIG. 1 will be described with reference to FIG. 3, but a description of elements equal or similar to the elements illustrated in FIG. 1 will be omitted.

Referring to FIG. 3, the intercooler 135 and the EGR cooler 130 are disposed side by side and in parallel based on a flow direction in which intake air passes through the intercooler 135. However, the low-temperature coolant sequentially passes through the intercooler 135 and the EGR cooler 130. That is, the low-temperature coolant passes through the intercooler 135, and then passes through the EGR cooler 130.

Figure 4:
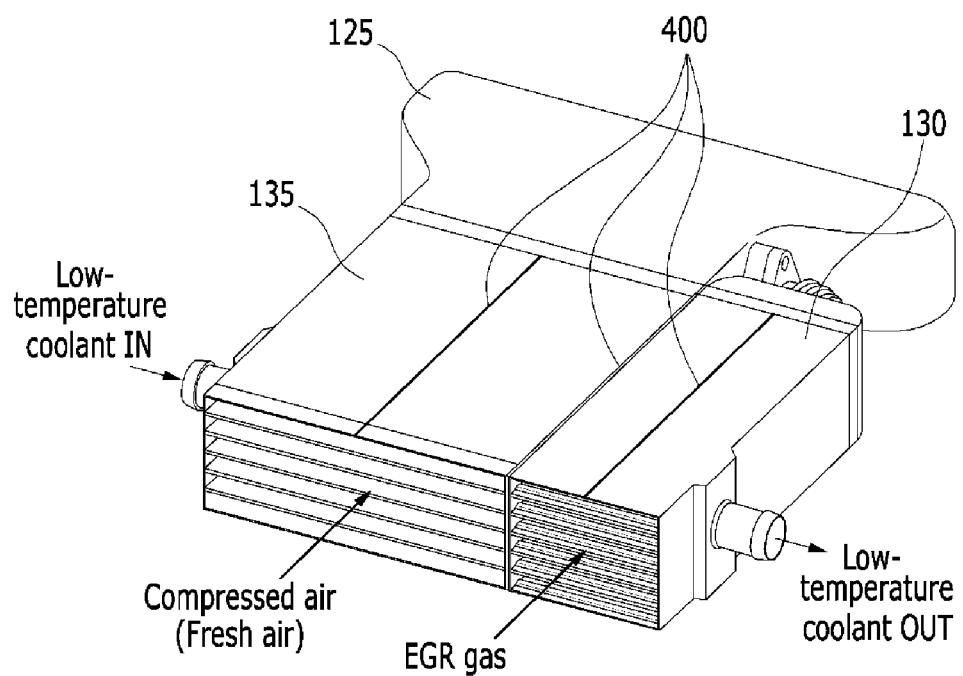
FIG. 4 is a partial perspective view of the engine system having the turbocharger according to the various exemplary embodiments of the present invention.

FIG. 4 is a partial perspective view of the engine system having the turbocharger according to the second exemplary embodiment of the present invention.

Referring to FIG. 4, the intercooler 135 and the EGR cooler 130 are coupled to each other through partition walls 400, and also coupled to the intake manifold 125. Therefore, the intake air passing through the intercooler 135 is directly supplied to the intake manifold 125, and the EGR gas passing through the EGR cooler 130 is directly supplied to the intake manifold 125 through the EGR line 155.

Figure 5:
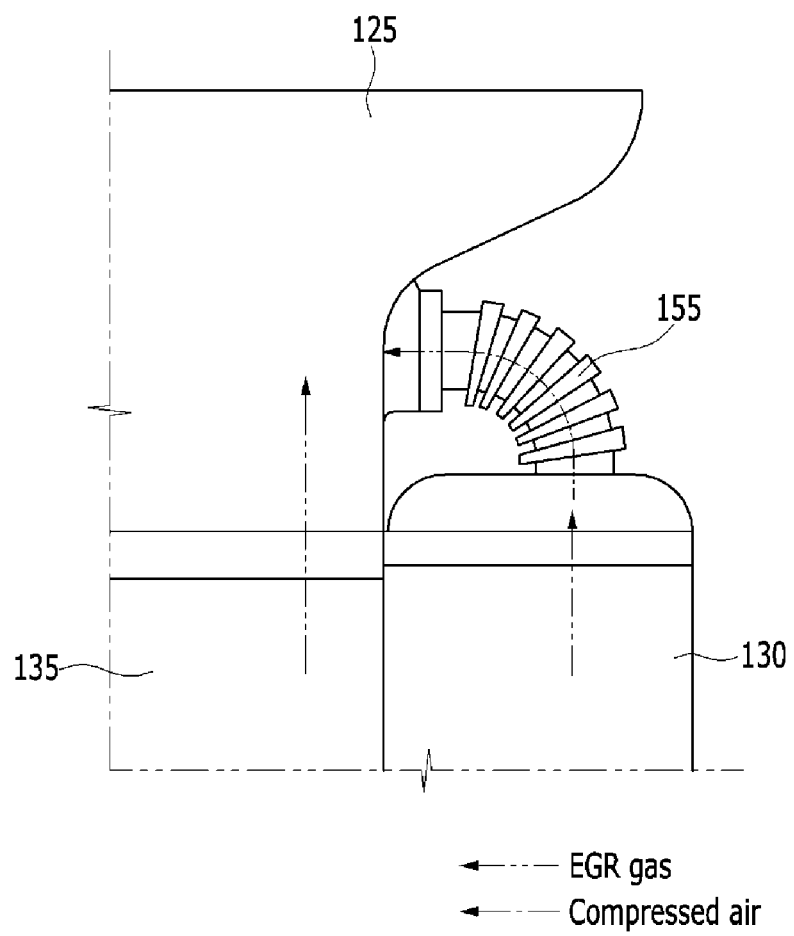
FIG. 5 is a partial top plan view of the engine system having the turbocharger according to the various exemplary embodiments of the present invention.

FIG. 5 is a partial top plan view of the engine system having the turbocharger according to the second exemplary embodiment of the present invention.

Referring to FIG. 5, the intake air passing through the intercooler 135 and the EGR gas passing through the EGR cooler 130 and the EGR line 155 are mixed in the intake manifold 125, and supplied to the combustion chamber.

Figure 6:
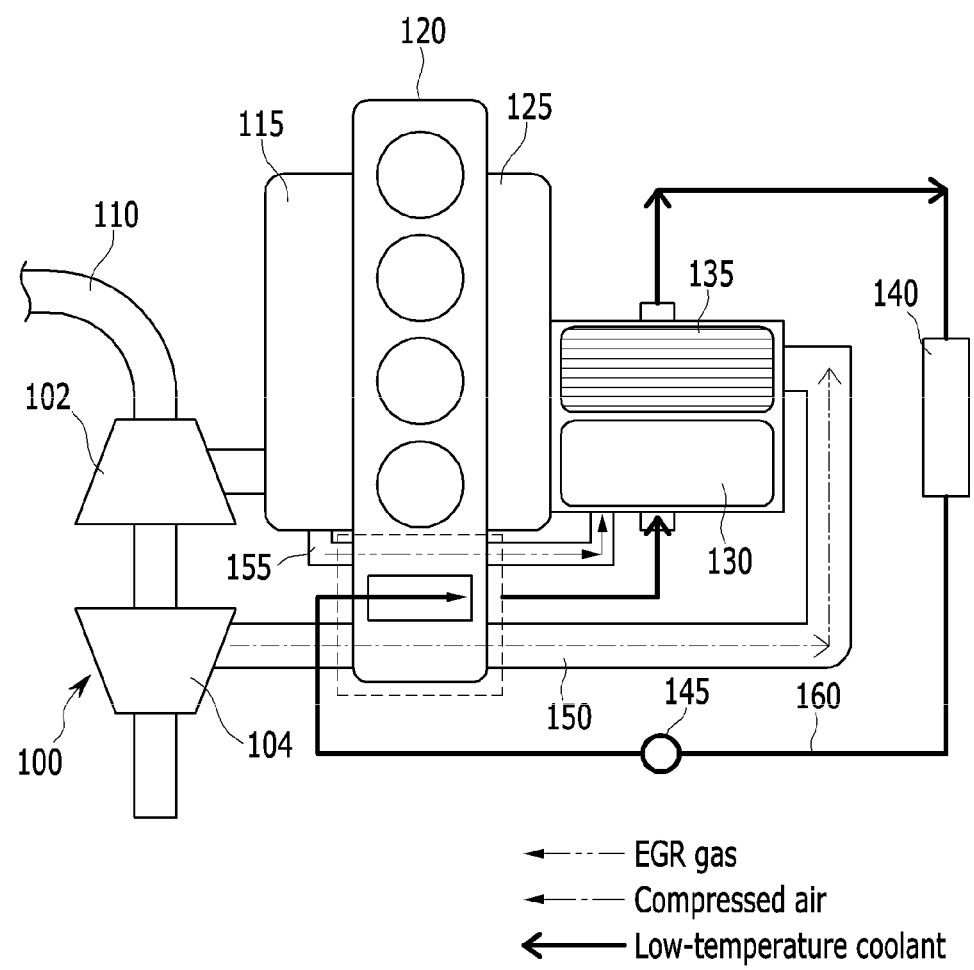
FIG. 6 is a schematic configuration diagram of an engine system having the turbocharger according to a various exemplary embodiments of the present invention.

FIG. 6 is a schematic configuration diagram of an engine system having the turbocharger according to a third exemplary embodiment of the present invention. Elements different from the elements illustrated in FIG. 3 will be described with reference to FIG. 6, but a description of elements equal or similar to the elements illustrated in FIG. 3 will be omitted.

Referring to FIG. 6, the intercooler 135 and the EGR cooler 130 are disposed side by side and in parallel based on a flow direction in which intake air passes through the intercooler 135. However, the low-temperature coolant sequentially passes through the EGR cooler 130 and the intercooler 135. That is, the low-temperature coolant passes through the EGR cooler 130, and then passes through the intercooler 135.

Figure 7:
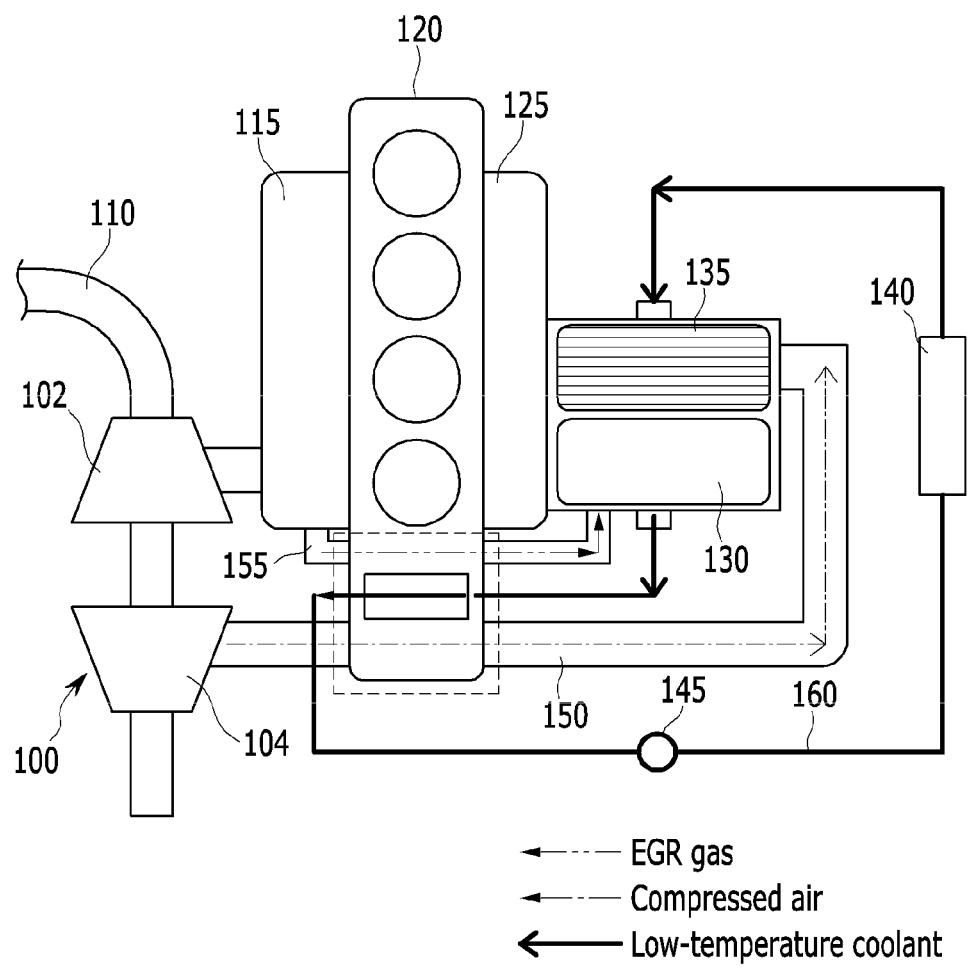
FIG. 7 is a schematic configuration diagram of an engine system having the turbocharger according to a various exemplary embodiments of the present invention.

FIG. 7 is a schematic configuration diagram of an engine system having the turbocharger according to a fourth exemplary embodiment of the present invention. Elements different from the elements illustrated in FIG. 6 will be described with reference to FIG. 7, but a description of elements equal or similar to the elements illustrated in FIG. 6 will be omitted.

Referring to FIG. 7, the intercooler 135 and the EGR cooler 130 are disposed side by side and in parallel based on a flow direction in which intake air passes through the intercooler 135.

Further, the low-temperature coolant sequentially circulates through the Low-temperature radiator 140, the intercooler 135, the EGR cooler 130, the cylinder head 120, and the coolant pump 145.

Figure 8:
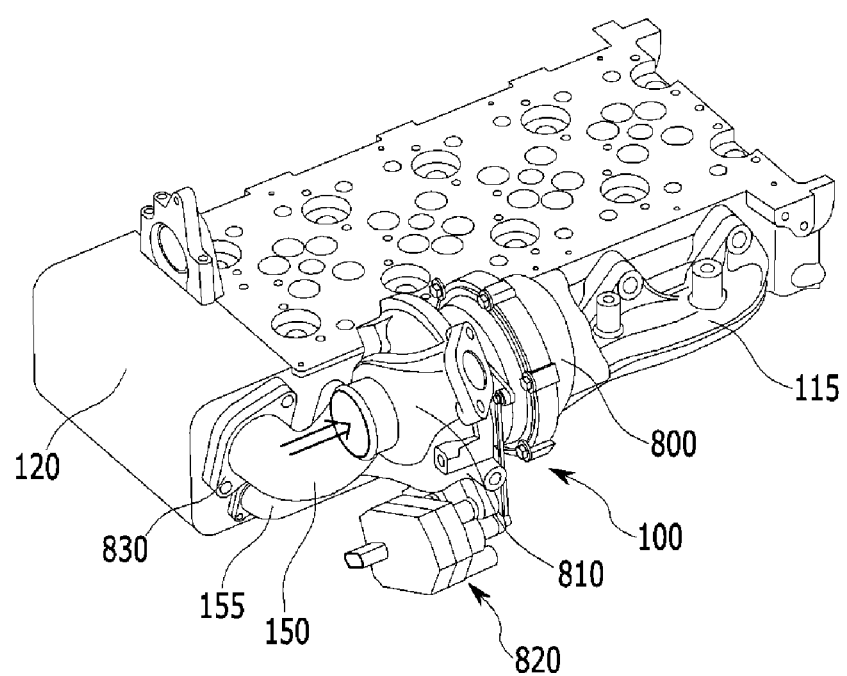
FIG. 8 is a partial perspective view of the engine system having the turbocharger according to the exemplary embodiment of the present invention.
Figure 9:
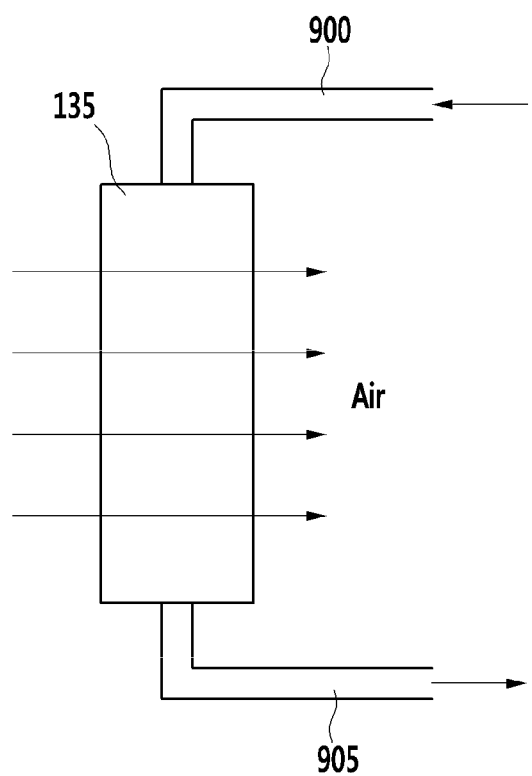
FIG. 9 is a schematic diagram of a conventional engine having an intercooler.

FIG. 8 is a partial perspective view of the engine system having the turbocharger according to the exemplary embodiment of the present invention.

Referring to FIG. 8, an exhaust manifold 115 is disposed at one side of the cylinder head 120, and the turbocharger 100 is disposed to be adjacent to the exhaust manifold 115.

The turbocharger 100 includes a turbine housing 800 in which the turbine 102 is mounted, a compressor housing 810 in which the compressor 104 is mounted, and an actuator 820 which controls exhaust gas flowing into the turbine 102.

Further, the intake line 150 is formed from the turbocharger 100 to the cylinder head 120, and the cylinder head 120 and the intake line 150 are fastened to each other through a connecting flange 830.

The EGR line 155 is formed below the intake line 150, and the EGR line 155 is also fastened to the cylinder head 120 through a flange. Therefore, the EGR line 155 and the intake line 150 may be designed to be disposed in a narrow space, and lengths of flow paths of the EGR line 155 and the intake line 150 may be shortened.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. An engine system having a turbocharger, comprising:
   a cylinder head, at which an intake manifold and an exhaust manifold are positioned;
   the turbocharger which is connected to the exhaust manifold and compresses intake air using exhaust gas discharged from the exhaust manifold;
   an intake line which is formed between the turbocharger and the intake manifold so as to supply compressed air, which is compressed by the turbocharger, through the cylinder head;
   an intercooler which is disposed to be adjacent to the intake manifold so as to cool the compressed air that is supplied through the intake line;
   an Exhaust Gas Recirculation (EGR) line connecting the exhaust manifold and the intake manifold and recirculating the exhaust gas, which is discharged from the exhaust manifold, to the intake manifold through the cylinder head; and an EGR cooler which is disposed to be adjacent to the intake manifold so as to receive an EGR gas from the EGR line and cool the EGR gas, wherein a low-temperature coolant that is supplied from a low temperature radiator to pass through the cylinder head cools the compressed air and the EGR gas that pass through the cylinder head, wherein the low-temperature coolant that is supplied from the low temperature radiator circulates through a coolant line independently of an engine coolant for cooling the cylinder head, and wherein the coolant line through which the low temperature coolant that is supplied from the low temperature radiator passes through the cylinder head so as to cool the compressed air, which passes through the cylinder head in the intake line, and the EGR gas, and then sequentially passes through the EGR cooler and the intercooler, and circulates through the low temperature radiator and a coolant pump.

2. An engine system having a turbocharger, comprising:
a cylinder head, at which an intake manifold and an exhaust manifold are positioned;
the turbocharger which is connected to the exhaust manifold and compresses intake air using exhaust gas discharged from the exhaust manifold;
an intake line which is formed between the turbocharger and the intake manifold so as to supply compressed air, which is compressed by the turbocharger, through the cylinder head;
an intercooler which is disposed to be adjacent to the intake manifold so as to cool the compressed air that is supplied through the intake line;
an Exhaust Gas Recirculation (EGR) line connecting the exhaust manifold and the intake manifold and recirculating the exhaust gas, which is discharged from the exhaust manifold, to the intake manifold through the cylinder head; and
an EGR cooler which is disposed to be adjacent to the intake manifold so as to receive an EGR gas from the EGR line and cool the EGR gas,
wherein a low-temperature coolant that is supplied from a low temperature radiator to pass through the cylinder head cools the compressed air and the EGR gas that pass through the cylinder head,
wherein the low-temperature coolant that is supplied from the low temperature radiator circulates through a coolant line independently of an engine coolant for cooling the cylinder head, and
wherein the coolant line through which the low temperature coolant that is supplied from the low temperature radiator passes through the intercooler and the EGR cooler, and then
passes through the cylinder head so as to cool the compressed air and the EGR gas that pass through the cylinder head, and circulates through a coolant pump and the low temperature radiator.

3. The engine system having the turbocharger of claim 2, wherein
the coolant line through which the low temperature coolant that is supplied from the low temperature radiator passes through the cylinder head so as to cool the compressed air, which passes through the cylinder head in the intake line, and the EGR gas, and then sequentially passes through the intercooler and the EGR cooler, and circulates through the low temperature radiator and a coolant pump.

4. An engine system having a turbocharger, comprising:
a cylinder head, at which an intake manifold and an exhaust manifold are positioned;
the turbocharger which is connected to the exhaust manifold and compresses intake air using exhaust gas discharged from the exhaust manifold;
an intake line which is formed between the turbocharger and the intake manifold so as to supply compressed air, which is compressed by the turbocharger, through the cylinder head;
an intercooler which is disposed to be adjacent to the intake manifold so as to cool the compressed air that is supplied through the intake line;
an Exhaust Gas Recirculation (EGR) line connecting the exhaust manifold and the intake manifold and recirculating the exhaust gas, which is discharged from the exhaust manifold, to the intake manifold through the cylinder head; and
an EGR cooler which is disposed to be adjacent to the intake manifold so as to receive an EGR gas from the EGR line and cool the EGR gas,
wherein a low-temperature coolant that is supplied from a low temperature radiator to pass through the cylinder head cools the compressed air and the EGR gas that pass through the cylinder head,
wherein the intercooler and the EGR cooler are coupled to the intake manifold, and
wherein the EGR cooler and the intercooler are sequentially disposed in series in a flow direction in which the intake air passes through the intercooler.

5. The engine system having the turbocharger of claim 4, wherein the intercooler and the EGR cooler are coupled to each other.

6. The engine system having the turbocharger of claim 4, wherein the EGR gas, which is cooled by the EGR cooler, is mixed with the intake air, which is cooled by the intercooler, in the intake manifold.

7. An engine system having a turbocharger, comprising:
a cylinder head, at which an intake manifold and an exhaust manifold are positioned;
the turbocharger which is connected to the exhaust manifold and compresses intake air using exhaust gas discharged from the exhaust manifold;
an intake line which is formed between the turbocharger and the intake manifold so as to supply compressed air, which is compressed by the turbocharger, through the cylinder head;
an intercooler which is disposed to be adjacent to the intake manifold so as to cool the compressed air that is supplied through the intake line;
an Exhaust Gas Recirculation (EGR) line connecting the exhaust manifold and the intake manifold and recirculating the exhaust gas, which is discharged from the exhaust manifold, to the intake manifold through the cylinder head; and
an EGR cooler which is disposed to be adjacent to the intake manifold so as to receive an EGR gas from the EGR line and cool the EGR gas,
wherein a low-temperature coolant that is supplied from a low temperature radiator to pass through the cylinder head cools the compressed air and the EGR gas that pass through the cylinder head,
wherein the intercooler and the EGR cooler are coupled to the intake manifold, and wherein the EGR cooler and the intercooler are disposed side by side and in parallel with a flow direction in which the intake air passes through the intercooler.

8. The engine system having the turbocharger of claim 7, wherein the intercooler and the EGR cooler are coupled to each other.

9. The engine system having the turbocharger of claim 7, wherein the EGR gas, which is cooled by the EGR cooler, is mixed with the intake air, which is cooled by the intercooler, in the intake manifold.

10. An engine system having a turbocharger, comprising:
a cylinder head, at which an intake manifold and an exhaust manifold are positioned;
the turbocharger which is connected to the exhaust manifold and compresses intake air using exhaust gas discharged from the exhaust manifold;
an intake line which is formed between the turbocharger and the intake manifold so as to supply compressed air, which is compressed by the turbocharger, through the cylinder head;
an intercooler which is disposed to be adjacent to the intake manifold so as to cool the compressed air that is supplied through the intake line;
an Exhaust Gas Recirculation (EGR) line connecting the exhaust manifold and the intake manifold and recirculating the exhaust gas, which is discharged from the exhaust manifold, to the intake manifold through the cylinder head; and
an EGR cooler which is disposed to be adjacent to the intake manifold so as to receive an EGR gas from the EGR line and cool the EGR gas,
wherein a low-temperature coolant that is supplied from a low temperature radiator to pass through the cylinder head cools the compressed air and the EGR gas that pass through the cylinder head,
wherein the low-temperature coolant that is supplied from the low temperature radiator circulates through a coolant line independently of an engine coolant for cooling the cylinder head,
wherein a compressed air passage, which passes through the cylinder head, is formed in a cylindrical shape so as to correspond to the intake line,
wherein an EGR gas passage, which passes through the cylinder head, is formed in a cylindrical shape so as to corresponding to the EGR line, and
wherein a low-temperature coolant passage through which the low-temperature coolant passes that is supplied from the low temperature radiator is formed at a periphery of the compressed air passage and the EGR gas passage.

11. The engine system having the turbocharger of claim 10, wherein
the coolant line through which the low temperature coolant that is supplied from the low temperature radiator passes through the cylinder head so as to cool the compressed air, which passes through the cylinder head in the intake line, and the EGR gas, and then
sequentially passes through the intercooler and the EGR cooler, and circulates through the low temperature radiator and a coolant pump.

* * * * *